March 20, 1962     A. C. SWITCH     3,025,817

APPARATUS FOR DISPENSING FLUID MATERIAL

Filed March 25, 1959

INVENTOR
A. C. SWITCH
BY A. C. Schwarz, Jr.
ATTORNEY

United States Patent Office 3,025,817
Patented Mar. 20, 1962

3,025,817
APPARATUS FOR DISPENSING FLUID MATERIAL
Aloysius C. Switch, Bradford, Pa., assignor to Western Electric Company, Incorporated, New York, N.Y., a corporation of New York
Filed Mar. 25, 1959, Ser. No. 801,823
1 Claim. (Cl. 113—93)

The present invention relates to apparatus for dispensing fluid material and more particularly to apparatus for applying measured amounts of molten solder onto electrical components.

An object of the present invention is to provide an improved apparatus for dispensing fluid material.

Another object of the invention is the provision of apparatus for feeding electrical components to a predetermined position and applying measured amounts of solder thereonto.

With these and other objects in view, the invention contemplates the provision of a carrier for supporting a plurality of articles in predetermined spaced relation to each other and advancing the articles to a predetermined dispensing station beneath the outlets of a metering valve mounted on the bottom of a container for holding a supply of molten solder therein. The valve has a housing with inlet ports communicating with the container and the molten solder therein and also has a member rotatably mounted in the housing and provided with metering recesses for receiving measured amounts of the molten solder. Drive means are provided for advancing the carrier intermittently to position the articles in the dispensing station for receiving the molten solder and for rotating the valve member to a first position with the metering recesses aligned with the inlet ports for receiving measured amounts of the solder therein and for rotating the valve member to a second position with the metering recesses in alignment with the outlets for discharging the measured amounts of molten metal onto the articles in the dispensing station.

Other objects and advantages of the invention will become apparent from the following detailed description thereof and the accompanying drawings in which.

Figure 1:
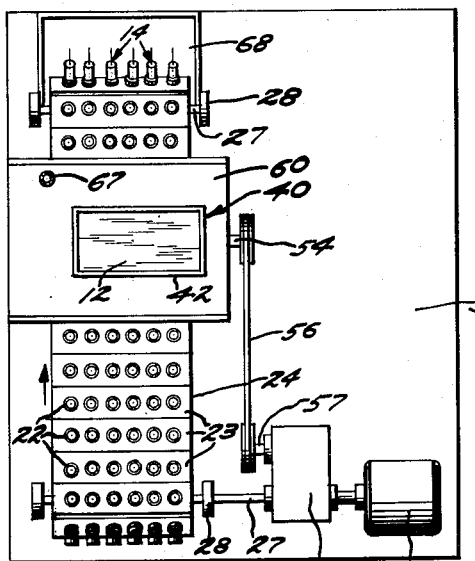
FIG. 1 is a plan view of the dispensing apparatus.

Referring to the drawings, the present apparatus 10 is designed to dispense predetermined amounts of molten solder 12 onto the ends of articles 14 positioned at a dispensing station 15 and for intermittently advancing the articles 14 to said station for receiving the molten solder. The articles 14, as shown herein, are electrical components comprising a capacitor 16 having metal caps 17 with leads 18 extending axially from opposite ends thereof, and a ceramic sleeve 20 encircling the capacitor. The solder 12 serves to seal and bond the capacitor 16 in the sleeve 20.

The articles 14 are supported on one end in holders 22 mounted on slats 23 with the leads 18 on one end of the articles extending downwardly through clearance apertures therefor in the slats 23 and in a conveyor 24 on which the slats are secured. The conveyor 24 is supported on pairs of rollers 26 secured to shafts 27 which are supported in brackets 28 mounted on a base plate 30. As seen in FIG. 1, one of the shafts 27 is driven through a drive unit 32 from a motor 34 to intermittently advance the conveyor 24 and position successive rows of the articles 14 in the dispensing station 15 with the upper ends of the articles 14 disposed in alignment with and below the ends of dispensing tubes 38 of a solder-dispensing device 40 in position to receive predetermined amounts of molten solder thereon.

Figure 4:
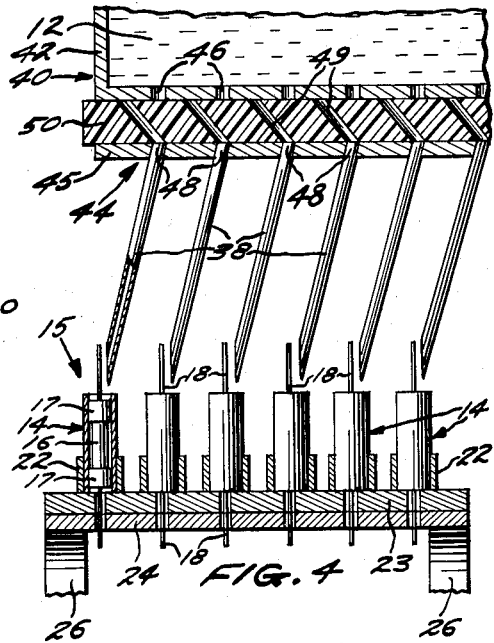
FIG. 4 is a fragmentary enlarged vertical sectional view of the apparatus taken along line 4—4 of FIG. 3.
Figure 2:
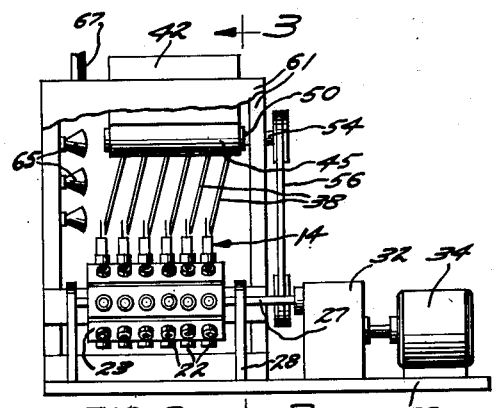
FIG. 2 is a front view of the apparatus with portions thereof broken away.

The solder-dispensing device 40 comprises a solder pot or container 42 for holding a supply of the molten solder 12 and a dispensing valve 44 extending across the lower portion of the solder pot above and in vertical alignment with a row of articles 14 at the dispensing station. The valve 44 includes a cylindrical valve housing 45 which is shown herein (FIG. 4) as being formed integral with the bottom of the solder pot 42 and having inlet ports 46 in the upper side thereof communicating with the interior of the solder pot and with the molten solder therein, and having a row of outlet ports 48 disposed on the lower side thereof into which the upper ends of the dispensing tubes 38 are secured. A cylindrical valve member 50 made of plastic material or fiber glass is rotatably mounted in the valve housing 45 and is provided with a plurality of obliquely disposed metering recesses or apertures 49 extending transversely therethrough and arranged in a row with one end of each of the metering recesses aligned with an outlet port 48 as shown in FIG. 4 when the valve member 50 is in its discharging position, and aligned with the intake port 46 when the valve member 50 is rotated one half a turn to its charging position.

The valve member 50 has a shaft 54 extending from one end thereof which is connected through a chain and sprocket connection 56 to a drive shaft 57 of the drive unit 32. The shaft 57 is actuated by the drive unit 32 to cause the valve member 50 to be intermittently rotated to a first position in timed relation to the indexing of the conveyor 24 so that the metering recesses 49 register with the upper inlet ports 46 and receive charges of molten solder therein during one portion of the cycle of operation, and so that, when a row of articles 14 has been advanced to the dispensing station 15, the valve 50 is rotated to a second position to align the metering recesses 49 with the discharge ports 48 to cause the charges of molten solder to be discharged from the metering recesses 49 and flow through the tubes 38 onto the upper ends of the articles 14. Thus for each indexing movement of the conveyor 12 and the movement of successive rows of articles 14 into the dispensing station 15, the valve 50 is actuated to charge the metering recesses 49 with predetermined quantities of the molten solder and is then actuated to effect a discharge of the molten solder onto the upper ends of the articles 14.

The drive unit 32, which is indicated diagrammatically in the drawings, may include a first Geneva drive mechanism for indexing the conveyor 24 and a second Geneva drive mechanism actuated in timed relation to the first Geneva drive mechanism for indexing the valve member 50 in a predetermined timed relation to the intermittent movement of the conveyor 24.

The solder pot 42 is suitably supported in a horizontal plate 60 which in turn is supported on the upper portion of a plurality of vertical walls 61 and cooperate therewith to form a heating chamber enclosing the metering valve 44 and a portion of the solder pot and the conveyor 24. Portions of the walls 61 are provided with openings to permit free movement of the conveyor 24 and the articles 14 thereon into and from the heating chamber. Suitable electrical heating means 64 (FIG. 3) are provided for heating the solder pot 42 to maintain the solder in a molten state, and suitable heating means such as infra-red lamps 65 are provided for heating the chamber and the articles 14 as they enter the heating chamber to raise the temperature of the articles to a predetermined value suitable for soldering when the articles arrive at the dispensing station 15 and to heat the dispensing tubes 38 to insure the free flow of the molten solder therethrough.

A gas such as nitrogen may be flowed into the chamber through a pipe 67 to provide an inert atmosphere for the soldering operation.

Figure 3:
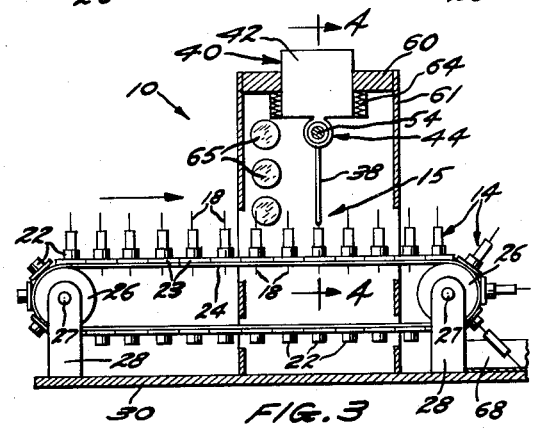
FIG. 3 is a vertical longitudinal sectional view of the apparatus taken along line 3—3 of FIG. 2.
Figures 5, 6:
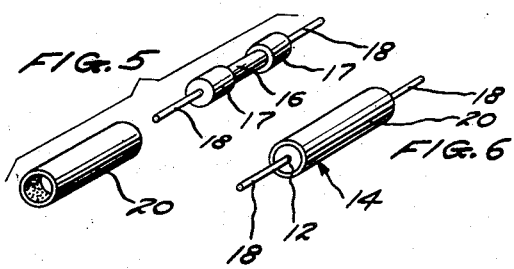
FIG. 5 is a perspective view of an electrical component with parts thereof shown in spaced relation to each other.
FIG. 6 is an assembled view of the electrical component.

In the operation of the device, an operator loads the articles 14 into the holders 22 at the left-hand end of the conveyor 24 as viewed in FIG. 3 and the drive unit 32 indexes the conveyor 24 and advances successive rows of the articles 14 into the dispensing station 15 in alignment with the dispensing tubes 38 after which the drive unit 32 rotates the valve 50 from its first position, in which the metering recesses 49 are aligned with the inlet ports 46 and filled with molten solder, to its second position with the recesses 49 aligned with the discharge portions 48 to cause the metered amounts of solder to flow from the recesses 49 through the dispensing tubes 38 onto the upper ends of the articles 14. After the solder has been deposited on the upper ends of the articles 14, the articles are advanced step by step by the conveyor 24 out of the heating chamber and are carried downwardly around the end of the conveyor and are ejected by gravity from the holders 22 into a tray 68 for receiving them.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

In an apparatus for dispensing measured amounts of fluid material, a container for holding a supply of the material, a hollow cylindrical valve housing on said container having an upwardly directed inlet port communicating with the material in said container and having a downwardly directed outlet port, a cylindrical valve body mounted in said valve housing for rotation and against axial movement and having an obliquely disposed aperture extending transversely therethrough capable of holding a predetermined amount of the material therein, one end of said aperture being alignable with said inlet port in response to rotation of said valve body to a first position for receiving the material and being alignable with said outlet port in response to rotation of said valve body to a second position for discharging the material, the other end of said aperture being closed in all positions of said valve body by said valve housing, and means for actuating said valve body to alternately align said one end of said aperture with said inlet port and said outlet port.

References Cited in the file of this patent

UNITED STATES PATENTS

| | | |
|---|---|---|
| Re. 9,205 | Dillon et al. | May 18, 1880 |
| 246,820 | Robbins | Sept. 6, 1881 |
| 365,316 | Norton | June 21, 1887 |
| 503,159 | Palmer | Aug. 15, 1893 |
| 744,132 | Tutwiler | Nov. 17, 1903 |
| 1,485,720 | Sage | Mar. 4, 1924 |
| 2,233,934 | Backhouse | Mar. 4, 1941 |
| 2,342,895 | Saari | Feb. 29, 1944 |
| 2,761,589 | Stach | Sept. 4, 1956 |